US006425350B2

(12) United States Patent
Bulanda

(10) Patent No.: US 6,425,350 B2
(45) Date of Patent: Jul. 30, 2002

(54) TRAINING METHOD AND APPARATUS FOR TRAINING AND USING DOGS IN THE DETECTION OF CONTAMINANTS

(76) Inventor: Susan Bulanda, 106 Halteman Rd., Pottstown, PA (US) 19465

( * ) Notice: Subject to any disclaimer, the term of this patent is extended or adjusted under 35 U.S.C. 154(b) by 0 days.

(21) Appl. No.: 09/738,673

(22) Filed: Dec. 16, 2000

Related U.S. Application Data

(60) Provisional application No. 60/171,993, filed on Dec. 23, 1999.

(51) Int. Cl.[7] .......... A01K 37/00

(52) U.S. Cl. .......... 119/712; 119/905

(58) Field of Search .......... 119/174, 712, 119/905; 220/4.07, 745, 748, 913

(56) References Cited

U.S. PATENT DOCUMENTS 2,067,830 A * 1/1937 Depew .......... 220/913
4,630,571 A * 12/1986 Palmer .......... 119/712
4,874,103 A * 10/1989 Quisenberry et al. .......... 220/913
5,351,653 A * 10/1994 Marischen et al. .......... 119/905
5,706,762 A * 1/1998 Dokken .......... 119/905
5,725,645 A * 3/1998 Wickland et al. .......... 220/745

* cited by examiner

*Primary Examiner*—Charles T. Jordan
*Assistant Examiner*—Elizabeth Shaw

(57) ABSTRACT

There exists a wide variety of strains of fungi and bacteria that can cause allergic and sometimes fatal reactions to humans who are exposed to these strains. Many of these contaminant strains exist and grow in buildings, structures and transportation sources used by people in everyday routine situations. A device simulating one or more of the noxious contaminants is used to train dogs to detect these contaminants in varying situations. A non-intrusive method for training one or more dogs to detect contaminants in a building or other structure, using the device, is also provided. By using dogs trained by the method, trainers can then instruct these contaminant-detecting dogs to precisely and efficiently locate areas of active contamination for future remediation without damage to the site under investigation.

19 Claims, 2 Drawing Sheets

TRAINING METHOD AND APPARATUS FOR TRAINING AND USING DOGS IN THE DETECTION OF CONTAMINANTS

CROSS-REFERENCE TO RELATED APPLICATIONS

This application claims the benefit of the filing date of U.S. provisional application no. 60/171,993, filed on Dec. 23, 1999 as attorney docket no. Bulanda-1, incorporated herein by reference.

FIELD OF INVENTION

The present invention relates to devices and methods used to train animals, and more particularly, to devices and methods used to field train dogs in the detection of contaminants such as fungus, biological and /or bacteria.

BACKGROUND OF THE INVENTION

Temperature, humidity and dampness are elements capable of fostering growth of contaminants such as strains of fungi (e.g., fungi, molds and yeast) and bacteria that can be noxious to people. When a person is exposed to these noxious strains of fungi and bacteria, an allergic reaction may often result. Typically, the degree of an individual's allergic reaction to such noxious strains may be quite varied depending on the individual, the exposure level and the contaminant present such that an individual's reaction may range from a mild irritation to a fatal reaction. Since medications provide only temporary relief to individuals affected by such reactions, the preferred solution is to locate and remove the contaminant from the site and then remediate the site as necessary.

Residential and commercial buildings and structures, in particular, host a wide variety of strains of fungi and bacteria, due to the materials used in their construction and the environmental effects inside and outside of the buildings. It is known that the microbiological decomposition of materials in a building occurs with time, due to environmental factors. This decomposition of material(s) often produces a wide variety of strains of such contaminants which may affect people who live or work in these environments. Similarly, the emitting of certain toxic compounds, antigens from molds and/or bacteria, and/or the presence of volatile organic compounds (VOCs) within such buildings also often affects people in the general building area. Typically, many individuals often become ill or sick, to varying degrees, from such contaminants in their environments and attribute their illness to "sick building syndrome" (SBS).

Additionally, spaces other than buildings, such as those involving transportation (e.g., automobiles, boats, trains, airplanes, trucks, busses, and the like) are also generally capable of hosting a wide variety of contaminant strains for similar reasons. Similarly, even partially-enclosed structures such as warehouses, picnic grounds and similar, also may host such contaminants.

Consequently, these spaces also may have contaminants present in sufficient amounts to cause people who frequent such spaces to become ill or sick.

While specific causes of SBS and the like remain difficult to detect and identify, it is known that a variety of contaminants may contribute to SBS, such as those contaminants and contributory factors previously mentioned. It is known however that many of the contaminants, such as VOCs, can cause chronic and acute health effects at high concentrations, and that even a low to moderate level exposure to such contaminants may produce certain reactions in some individuals who are hypersensitive.

Similarly, biological contaminants can cause fever, chills, cough, chest tightness, muscle aches, and allergic reactions. Example of biological contaminants include: pollen, bacteria, viruses, and molds, each of which can breed in stagnant water that has accumulated in humidifiers, drain pans, and ducts, or where water has collected on ceiling tiles, insulation, carpet, and similar. Additionally, there are numerous airborne fungi including, by way of example and not of limitation, Cladosporium sp. and Aspergillus sp. fungi, each of which is of respirable size to humans and typically exists in a particulate form. Further, the disintegration or decomposition of bacteria can release endotoxins which are present in the outer membrane of Pseudomonas, Klebsiella, Alcaligenes, Acinetobacter, Citrobacter and Enterobacter. Exposure usually occurs when the endotoxins are aerosolized as particles and can penetrate deeply into the lungs causing fever, cough, breathing difficulty and wheezing. All these bacteria grow in organic dusts and many are readily found in buildings identified as having SBS. Unfortunately, identifying, locating and removing these fungal and bacteria contaminants has proved difficult.

Present methods of contaminant detection are generally limited to air sampling and an intrusive investigation. Air sampling generally detects the presents of spore contaminants. However, air sampling necessitates that a substantial active spore presence of contaminant be airborne for detection to occur. As a result, air sampling is often costly and does not detect non-active spores. An intrusive investigation, alternatively, requires that an amplification site of contaminant (i.e., detecting elevated concentrations of active spores) be identified and that the physical intrusion into the amplification site be reasonably exact. Since neither of these methods is precise in its determination, these investigations may fail to detect sites affected by contaminants, damage the areas of interest, and may result in the release of additional contaminants (i.e., active and/or non-active spores) into the air.

Unfortunately, each of these methods is expensive, time-consuming, and often is imprecise. Further, since each of these methods tests only a limited space within a particular area to be searched, it is believed that each of these methods is inefficient in accurately determining a contaminant's location.

SUMMARY OF THE INVENTION

According to the present invention, a device and non-intrusive method is used for training dogs and using dogs in the field to detect contaminants such as fungi and bacteria in buildings, structures and other field locations where there is a likelihood of the presence of contaminants that are potentially noxious to humans. As used herein the term "contaminants" includes one or more fungi, bacteria, organic compounds, biological agents, or combinations thereof, which is or may be noxious to a human exposed to the contaminant.

It is known that dogs in particular have an acute sense of smell and have on average between twenty-five and forty times the number of olfactory cells that humans do. It is also known that certain dogs are also able to detect a scent even under water. Consequently, dogs have been used to perform various forms of scent-based detection work, including search and rescue of missing or injured persons, narcotic and drug detection by the police and federal authorities, accelerant detection in possible arson matters, and incendiary device detection for bomb threats. However, in each of these applications the dog seeks to detect a particular scent which is normally not present in the environment, but which is present to the extent that the scent exceeds other scents in the site's environment, where the dog is working.

For example, in a bomb threat situation, a dog is seeking an incendiary device scent which is typically greater than the scent of a surrounding, normal scent (e.g. the paint of the room's wall, the wax on the room's floor, or the mold present in the corner of the room) due to the device's composition or the concentration of the scent in the room. Typically, therefore the dog is able to "key" (i.e., identify and/or detect) on the sought scent as it is often readily distinguishable from other scents normally present in the environment.

For the present invention, however, a dog is used to detect one or more contaminants which may be no greater in concentration in the site than those scents which are traditionally considered to be a part of the background of the site (e.g. scents such as fungus, bacteria, etc.). Consequently, the dog must be able to "key" on one or more common contaminant scents which may be no greater in concentration than any of the scents normally associated with the site and/or which may be of a scent which is normally associated with the site (e.g., normal molds, mildew, etc.).

DETAILED DESCRIPTION OF THE INVENTION

Figure 1:
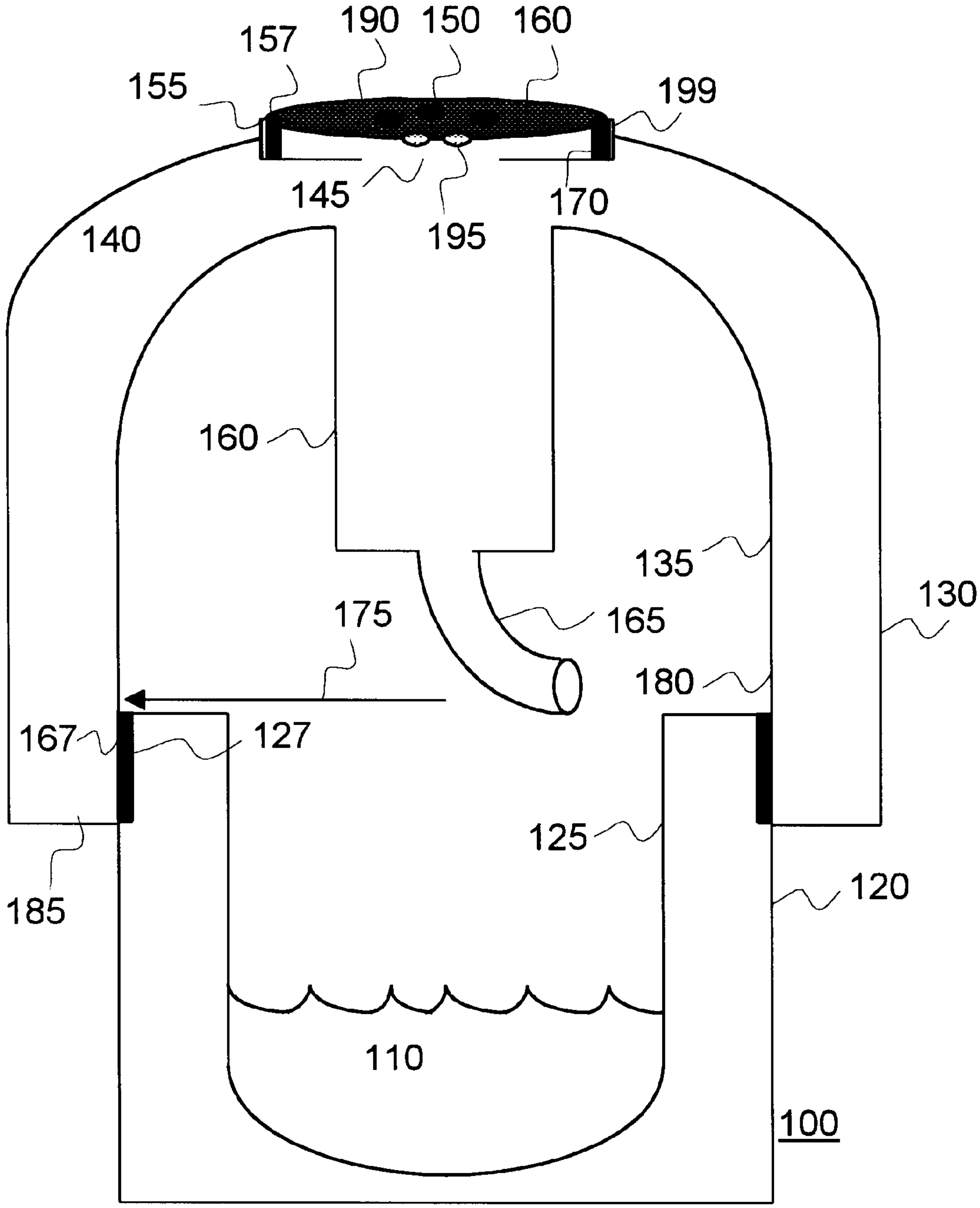
FIG. 1 shows a spill-free apparatus of the present invention containing a liquid device sample of a formulated stock culture contaminant.

It is an objective of the present invention to provide a device for use in the training of one or more dogs to detect one or more contaminants, wherein the device simulates the one or more contaminants to be detected by the dog, and wherein the device does not adversely affect any of the dogs when each is exposed to the device.

In one embodiment, the device is a semi-rigid, VOC-free apparatus for training one or more animals in the detection of viable contaminants in a field environment, comprising a housing, for containing one or more scent samples, having an upper portion and a lower portion having a cup-shaped inner surface area, and a means for removably securing said upper portion with said lower portion, wherein said upper portion further comprises an adjustable exposure means for either increasing or decreasing the exposure of said one or more samples contained within said apparatus to the atmosphere.

The device used is a formulated sample of the one or more contaminants which are to be detected by the dog. The formulated sample is comprised of active (i.e., live) cultures of the one or more contaminant species of interest, at a minimal concentration, wherein each of the active cultures undergoes an autoclave process to deactivate each of the active cultures initially used in the sample's formulation. As used herein, the term "minimal concentration" is defined as a concentration of at least one part per trillion (1 ppt) for VOCs, or a concentration of at least five (5) colony forming units per $m^3$ of air ($cfm/m^3$) and preferably at least eighteen (18) $cfm/m^3$ for spores. The sample may be of a liquid, powder, gaseous or solid form which retains each of the contaminant scent characteristics while being devoid of the previously live or active contaminant cultures.

In another embodiment of the present invention, three liquid device samples are used at a field site, each of which is comprised of a stock culture provided by a commercial vendor (such as American Type Culture Collection (ATCC) of Maryland). A first device sample being comprised of a *Stachybottys charatarum* stock (ATCC 18842), a second device sample being comprised of *Aspergillus versicolor* stock (ATCC 9577) and a third device sample being comprised of *Aspergillus fumigatus* stock (ATCC DAOM 222005).

In preparing each of the three device samples, three primary sterile centrifuge tubes were each filled with 10 ml of sterile water and then each was flamed. Then, about one loopful of each of the three stock cultures was placed into one of the three centrifuge tubes. As used herein the term "loopful" is a term of art commensurate with that definition known in the field wherein a loop device is used to prepare a sample of a stock culture. Each tube was incubated at approximately 25° C. for about 48 hours. Approximately one loopful of the incubated solution from each tube was then plated onto sterile agar plates having a media thereon. The incubated solution having the *Stachybotrys charatarum* stock was plated onto a malt extract media and both the incubated solution having the *Aspergillus versicolor* stock and the incubated solution having the *Aspergillus fumigatus* stock were plated onto a Sabouraud dextrose media. Each of the plates of the incubated solutions was incubated at approximately 25° C. for about 48 hours and evaluated to determine the viability of the spore stocks. Each of the tubes were then autoclaved at about 121° C., near 15 psi, for about 45 minutes. Approximately one loopful of the autoclaved solution from each tube was then plated onto sterile agar plates having a media thereon. The autoclaved solution having the *Stachybotrys charatarum* stock was plated onto a malt extract media and both the autoclaved solution having the *Aspergillus versicolor* stock and the autoclaved solution having the *Aspergillus fumigatus* stock were plated onto a Sabouraud dextrose media. Each of the plates of the autoclaved solutions was incubated at approximately 25° C. for about 48 hours and evaluated to determine the non-viability of the spore stocks.

Each of the autoclaved solutions (i.e., non-active solutions) was then formulated such that approximately a minimal concentration of each stock culture sample was present in each of the three device samples such that each of the device samples could be used by a canine trainer for training a dog to detect a specific contaminant at a location determined by the canine trainer, without detrimental impact to the dog.

In another embodiment, the device is a formulated liquid device sample of a stock culture in a spill-free, semi-rigid, VOC-free container in which an adjustable lid of the container may be adjusted by a trainer to either increase or decrease the atmospheric exposure of the device sample for modifying training of a dog. In a further embodiment, the device is a formulated liquid device sample of a stock culture which may be injected by a syringe-like instrument into a testing site (e.g. a wall, carpeting, mattress) for modifying training of a dog.

FIG. 1 shows a spill-free device 100 of the present invention containing a liquid device sample 110 of a formulated stock culture contaminant. The device 100 preferably is a semi-rigid, VOC-free container having a lower vessel 120 with an inner surface area 125 and a lower container threaded connection means 127, an upper cap 155 having an upper cap threaded connection means 157, and cap apertures 160 on a rotatable cap lid 190 wherein the cap lid 190 has grips 199 for rotating, an upper vessel 130 having an inner surface area 135 greater than the inner surface area 125 of the lower vessel 120, an upper container threaded connection means 167 which is securably connectable with the lower container connection means 127, an inner hull 140, an upper vent 145 having a plurality of apertures 150 on the upper vent surface 195 integrated with the inner hull 140 and a lower cap threaded connection means 170 which is securably connectable with the upper cap threaded connection means 157 and a vent stem 160 having a curved open end 165 which extends from the upper vent 145 towards the center of the inner surface volume of the upper vessel 130 a distance of less than two-thirds of the radius 175 of the upper surface 180 of the lower lip 185 of the upper vessel 130, wherein the vent stem 160 is integrated with the vent hull 140.

A trainer may insert a liquid device sample 110 into the lower vessel 120. Alternatively, the trainer may simply swipe a device sample portion into the inner surface of the upper vessel 130 or the lower vessel 120. The trainer then secures the upper vessel 130 to the lower vessel 120 by connecting their respective connection means 167, 127. The trainer then secures the upper cap 155 by connecting the upper cap threaded connection means 157 with the lower cap threaded connection means 170. Preferably, each of the threaded connection means (127, 157, 167, 170) is a threaded connection mount, such that when each is securely connected with its respective mate, a secure and sealable connection results. The trainer then adjusts the exposure of the contaminant 110 to the outside environment by grasping the grips 199 and rotating the cap lid 190 such that the apertures 160 of the cap lid 190 are adjustably aligned to a predetermined setting at the discretion of the trainer with the apertures 150 of the upper vent 145.

The trainer may then place the device 100 at a training site to train one or more dogs to detect the scent of the contaminant sample 110.

Although the device 100 as shown in FIG. 1 contains a contaminant sample 110, the device 100 may be used with any liquid or gas for any purpose wherein a spill-proof and/or exposure-adjustable device may be utilized (e.g., aroma therapy, fragrance and scent release, child olfactory-stimulus products, and the like).

It is also an objective of the present invention to provide a relatively simple and safe method for training one or more dogs to detect one or more contaminants using a device comprised of a formulated sample of the one or more contaminants which are to be detected by the dog. The method comprises the steps of: (1) placing one or more devices in a training area in one or more predetermined locations, (2) introducing one or more dogs responsive to a field command into the training area; and (3) instructing each of the dogs, separately or jointly, using the field command to locate the one or more devices. Optionally, during the training process, as the dog locates each of the devices which have been placed in the training area, it is desirable to provide the dog being trained a reward (e.g., a biscuit, a dog treat, additional physical attention, etc.) to further enforce the training progress and successes of the dog.

As used herein, the term "field command" includes one or more commands such as "fetch", "find", "search", "work", "stay" and similar, which when made by a canine handler to a dog responsive to such a command, will cause the dog to react as instructed in a controlled and conditioned manner. As used herein, the term "canine handler" shall also be interpreted to mean "canine trainer" or person capable of instructing and commanding a dog to act in a predetermined and conditioned manner. As used herein, the term "device" shall be interchangeable with that of an "apparatus."

In a preferred embodiment, a trained dog of the present invention, in which is a dog trained by the method of the present invention, is selected from stock which has been selectively bred such that certain desirable instincts are likely known to be present in the selected breed stock (e.g., ability to perform "tricks" on command, ability to listen and respond, mental and physical conditioning providing an ability to work such as in search or rescue, and similar). In another preferred embodiment, a dog which has prior field experience and is able to respond to more than one field command such that the dog may actively signal his canine handler upon completing the field command given, is desirable and utilized in certain embodiments of the present invention. However any dog having a desire to work in the field, as defined by its handler, thereby having at least a minimal mental ability prerequisite, mental desire, and a minimal physical ability, is understood by those skilled in the art to be considered for use in and by the present invention.

In another embodiment of the present invention, a Border collie having prior field training is trained using the device (100 of FIG. 1) having a liquid formulated contaminant sample (110 of FIG. 1) in a minimal concentration. Alternatively, a handler applies the formulated sample to three absorbing pads and each pad is then separately placed into its own device (100) or into a perforated sampling tube. Then the trainer places each of the three devices or tubes at predetermined locations within the training area; however, it is preferred that the device is used.

The devices are placed by the trainer in visible locations and/or in proximity to one another during the initial training of a dog so as to reinforce early successes the dog is able to achieve during the process. As early successes are achieved by the dog being trained, the trainer may optionally thereafter hide the devices, reduce the quantity of devices, remove the pads from devices when used, reposition the devices at greater distances from one another, and similar.

The trainer thereafter introduces the Border collie into the training room and commands the Border collie using a trigger command, to locate the devices, although any command sequence or technique may be used with the present invention. As used herein, the term "trigger command" is defined to include any verbal or physical action performed by the trainer which the dog has been trained to be responsive to, such as a field command of "search" or a single clap of the trainer's hands. Alternatively, the trainer may use a "click-treat" method wherein a dog is commanded to act by clicks from the trainer and is reward with a treat instantly when the dogs promptly responds to the trainer's click(s). The Border collie then searches for each of the devices and the trainer may thereafter assist in the Border collie's search efforts by providing further trigger commands or other training guidance. At the discretion of the trainer, the trainer provides the Border collie a dog treat after locating each of the devices in the testing room and may repeat the process until the desired result is achieved.

Figure 2:
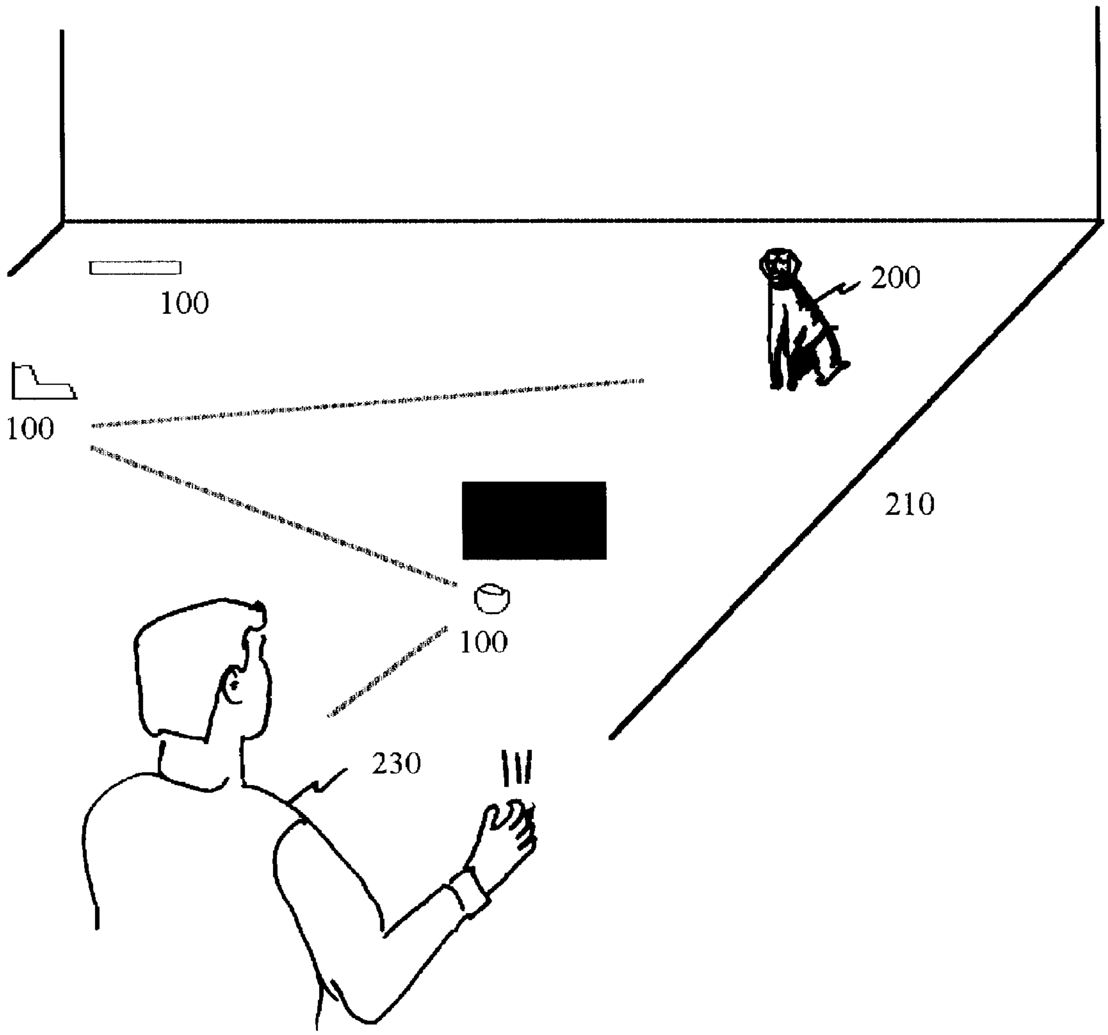
FIG. 2 shows a dog being trained in a training room to detect contaminants located in devices in which a trainer instructs the dog to locate one or more of the devices, according to an embodiment of the present invention.

FIG. 2 shows a dog 200 being trained in a training room 210 to detect contaminants located in devices (100 of FIG.

1) in which a trainer 230 instructs the dog 200 to locate one or more of the devices 100, according to an embodiment of the present invention.

It is a further objective of the present invention to provide a method for the non-intrusive detection of contaminants using one or more trained dogs which have been trained to detect one or more contaminants using a device comprised of a formulated sample of the one or more contaminants which are to be detected. The method for training one or more animals to detect at least one viable contaminant in a field environment, using one or more non-viable formulated contaminant samples, comprises the steps of:

(a) providing a training area, (b) placing at least one sample at a predetermined field sample location in said training area, (c) admitting at least one animal to said training area at a predetermined field animal location, (d) instructing each animal using at least one field triggering command to first key on at least one sample and thereafter traverse a path to non-intrusively locate each sample at its respective field sample location in said training area, wherein each formulated sample comprises a minimal concentration of one or more non-viable contaminant cultures of interest.

As used herein, the term "command" includes field commands, trigger commands and all other oral, visual, auditory and/or physical signals which when made by a canine handler to a dog responsive to such a command, will cause the dog to react as instructed in a controlled and conditioned manner. As used herein the term "site" includes any area which is susceptible to the presence of a minimal contamination including but not limited to buildings, structures, spaces, rooms, walls, containers, wallpaper, floors, flooring, edible products, foods and produce, food-additives, clothing, fabrics, any portion or sample thereof, and/or any organic matter capable of supporting microbiological growth or any surface capable of supporting or containing such organic matter.

In another embodiment of the present invention, a Border collie having prior field training and having been trained to detect microbiological contaminants, is introduced into a room in which at least one person was identified as being allergic to and/or irritated by an unidentified contaminant in the room (e.g., allergic alveolitis, hypersensitivity pneumonitis, and similar). Once introduced to the room, the Border collie is then commanded by a trainer to locate possible areas of contamination using a trigger command. The Border collie then searches for "active contamination sites" within the room. As used herein the term "active contamination site" is defined as a location in or on a "site" having a minimal concentration of contamination. As the Border collie searches, areas identified by the Border collie as being active contamination sites may then be marked by the trainer or by the Border collie depending on its level of experience and field training. Optionally, these marked areas may then be sampled for further analysis.

In another embodiment of the present invention, a Border collie having prior field training and having been trained to detect microbiological contaminants, is introduced to a four square foot portion of a carpet which was located in a room in which at least one person was allergic to and/or irritated by the carpeting. Once introduced to the carpet portion, the Border collie is then commanded by a trainer to locate possible areas of contamination using a trigger command. The Border collie then searches for active contamination sites on the carpet portion. As the Border collie searches, areas identified by the Border collie as being active contamination sites may then be marked, identified and/or sampled.

In another embodiment of the present invention, two Border collies and a Havanese, each having prior field training and each having been trained to detect different contaminants from one another, are introduced to a site having possible contaminants. Preferably, each dog is introduced to or into the site one at a time. Once introduced to the room, each of the dogs is then commanded by a trainer, separately or jointly, to locate possible areas of contamination, using a single or series of trigger commands. Each dog then searches for active contamination sites within the room, based upon each of their own contaminant detection training. As each dog searches, areas identified by each dog as being active contamination sites may then be marked, identified, sampled and/or compared with the results of each of the other dogs' findings for comparison and evaluation.

Another embodiment of the present invention includes a method of using at least one dog trained using non-viable contaminant samples to non-intrusively detect one or more viable contaminants at one or more undetermined locations at a field site having at least said one or more viable contaminants therein, comprising the steps of:

(a) providing a field site area, (b) admitting at least one dog to said site area at a predetermined site animal location, (c) instructing each dog using at least one field triggering command to first key on at least one viable contaminant and thereafter traverse a path to non-intrusively locate said viable contaminant at its respective contaminant location site at the site area, and, (d) rewarding each dog upon locating at least one contaminant location site.

By way of example without limitation, a Border collie, having prior field training and having been trained to detect contaminants used by possible terrorists, including microbiological agents, is introduced to a site having a plurality of containers, one or more of which may contain hazardous biological agents and/or microbiological contaminants. Once introduced to the site, the Border collie is then commanded by a trainer to locate containers possibly containing hazardous biological agents and/or microbiological contaminants, using a single or series of trigger commands. The Border collie then searches for containers having active contamination sites. Containers identified by the Border collie as having active contamination sites may then be marked, identified, and/or sampled.

While the exemplary embodiments of the present invention have been described with respect to training of dogs and the use of dogs to detect contaminants, including possible implementations with more than one dog at a time, the present invention is not so limited. The present invention may also be used to train other animals having olfactory sensory capabilities better than those of humans, such as those of a pig, cat, rat, and similar, and/or any other animal having a vomero-nasal area greater in size than that of a human. The present invention may also be used with two or more animals simultaneously, wherein, optionally, an untrained animal may be teamed with a trained animal and using the method herein, such untrained animal may have its training supplemented by the presence, movements and actions of the trained animal.

It will be further understood that various changes in the details, materials, and arrangements of the elements and/or steps which have been described and illustrated in order to explain the nature of this invention may be made by those skilled in the art without departing from the scope of the invention as expressed in the following claims. The above disclosed invention has a number of particular features which should preferably be employed in combination, although each is useful separately without departure from the scope of the invention.

What is claimed is:

1. A semi-rigid, VOC-free apparatus for training one or more animals in the detection of viable contaminants in a field environment, comprising a housing, for containing one or more scent samples, having an upper portion and a lower portion having a cup-shaped inner surface area, and a means for removably securing said upper portion with said lower portion, wherein said upper portion further comprises an adjustable exposure means for either increasing or decreasing the exposure of said one more samples contained within said apparatus to the atmosphere, and further comprising a hollow vent stem integrated with said upper portion having a curved distal end fixedly angled and arranged such that said stem provides a path for scents of said one or more samples contained within said apparatus to controllably diffuse scent of contained one or more formulated samples along a predetermined length of said stem to one or more adaptable apertures integrated with said upper portion to the atmosphere.

2. The apparatus according to claim 1, wherein said lower portion comprises an inner surface area lesser than an inner surface area of said upper portion, and said upper portion further comprises a hollow inner hull portion formed between an inner surface wall and an outer surface wall.

3. The apparatus according to claim 2, wherein said apparatus is spill-proof when said upper portion is secured with said lower portion.

4. The apparatus according to claim 1, wherein said apparatus contains at least one scent sample wherein said sample comprises a minimal concentration of one or more non-viable cultures formulated from one or more viable cultures selected from one or more of the group of contaminant cultures consisting of fungal, biological and bacteria contaminants.

5. The apparatus according to claim 4, wherein said one or more animals is one or more dogs.

6. The apparatus according to claim 5, wherein said one or more dogs is responsive to at least one field command.

7. A method for training one or more animals to detect at least one viable contaminant in a field environment, using one or more non-viable formulated contaminant samples, comprising the steps of:

(a) providing a training area, (b) placing at least one sample at a predetermined field sample location in said training area, (c) admitting at least one animal to said training area at a predetermined field animal location, (d) instructing each animal using at least one field triggering command to first key on at least one sample and thereafter traverse a path to non-intrusively locate each sample at its respective field sample location in said training area, wherein each formulated sample comprises a minimal concentration of one or more non-viable contaminant cultures of interest.

8. The method according to claim 7, further comprising measuring the time each animal takes to locate each sample.

9. The method according to claim 8, further comprising rewarding each animal upon locating at least one field sample.

10. The method according to claim 9, wherein said animal is a dog.

11. The method according to claim 8, further comprising moving one or more of each field samples to one or more second field sample location having a predetermined viewing line-of-sight in relation to each field animal location.

12. The method according to claim 11 in which each field sample is positioned at a location which is obstructed from at least one animal.

13. The method according to claim 8, wherein said formulated sample comprises a minimal concentration of one or more contaminants prepared by combining approximately one loopful of one or more viable contaminant cultures in a first solution, incubating said first solution, and autoclaving said incubated solution to create said formulated sample having one or more non-viable contaminant cultures.

14. The method of claim 13, in which said formulated sample comprises one or more contaminants selected from the group consisting of *Stachybotrys chanarum, Aspergillus versicolor*, and *Aspergillus fumigatus*.

15. The method of claim 8, further comprising admitting at least two dogs into said training area at an identical field animal location.

16. The method of claim 15, in which physical movement of one of said dogs is restrained to be in relation with physical movement of at least one other dog, wherein such restraint provides supplemental training.

17. A method of using at least one dog trained using non-viable contaminant samples to non-intrusively detect one or more viable contaminants at one or more undetermined locations at a field site having at least said one or more viable contaminants therein, comprising the steps of:

(a) providing a field site area, (b) admitting at least one dog to said site area at a predetermined site animal location, (c) instructing each dog using at least one field triggering command to first key on at least one viable contaminant and thereafter traverse a path to non-intrusively locate said viable contaminant at its respective contaminant location site at the site area, and, (d) rewarding each dog upon locating at least one contaminant location site.

18. The method according to claim 17, further comprising analytically inspecting said contamination location site to determine a concentration of viable contamination present at said contamination location site.

19. The method according to claim 18, in which said contaminants are one or more active contaminants selected from the group consisting of fungal, biological and bacteria contaminants.

* * * * *